Nov. 9, 1937.  H. B. WEBSTER  2,098,476

DIRECTIONAL INCLINATION RECORDER

Filed Nov. 11, 1935

RECORD FOR INCLINATION OF WELL
5°- N. 30° E.

RECORD FOR INCLINATION OF WELL
10°- N. 30° E.

Inventor
HUGH B. WEBSTER
by J. N. Adams
Attorney

Patented Nov. 9, 1937

2,098,476

UNITED STATES PATENT OFFICE 2,098,476

DIRECTIONAL INCLINATION RECORDER

Hugh B. Webster, Oakland, Calif., assignor to Standard Oil Company of California, San Francisco, Calif., a corporation of Delaware Application November 11, 1935, Serial No. 49,273

5 Claims. (Cl. 33—206)

This invention relates to a well surveying device of the type adapted to be lowered into a bore hole and arranged to give a suitable record of the orientation of the hole at a given point, and particularly refers to a means for indicating the direction and degree of inclination of the said device.

In drilling oil wells or the like, it may happen, due to variations in strata through which the drill passes, or to other causes, that the bore hole will deviate to a considerable extent from the vertical, and assume very decided angles relative to the vertical direction. As a result of this deviation, serious errors may enter into the geological interpretations and recommendations concerning sub-surface structure, water shut-off, valuations of property, etc. In view of the resultant desirability of determining the location of any and all parts of a bore hole, various devices have been devised for determining the path of the bore hole through the soil.

One of these devices is that shown in the United States Patent No. 1,960,038, issued May 22, 1934 to S. H. Willston et al. Briefly, that device constitutes means for obtaining a substantially continuous record of the deviation of a bore hole throughout its length and includes means for automatically photographing simultaneously the position of a gyroscope, the position of a bubble or other level, and a time piece, from which the deviation of a hole may readily be determined at various points along its length. Other devices of a more simple nature may include only means for making a single photograph or other record of a compass card or similar direction indicating mechanism, together with a bubble or other level indicating means.

The objects of this invention include the provision of means for obtaining the greatest accuracy of indication and record of the degree of inclination of a device of this nature and the bore hole in which it may be positioned.

Another object is to provide an improved form of level means for a device of this nature and particularly where a photographic record is to be obtained.

Another object is to provide a higher degree of accuracy of a level for apparatus of this kind, together with a spreading of the scale or indicator of a single instrument which will have a range beyond those heretofore employed and without any increase in the diameter of the equipment.

These and other objects and advantages will be more fully apparent from the following description and from the accompanying drawing, which forms a part of this specification and illustrates a preferred embodiment of this invention.

It is contemplated that this invention will be used with any of the well known forms of inclination recorders, which usually include a fluid pressuretight casing for protecting the mechanism, together with means for safely lowering the casing and the instrument therein into the well bore or casing, and, after the recording period has elapsed, withdrawing it again for examination. Such are well known in the art, are adequately described in the United States Patent No. 1,960,038 cited above, and need not be further detailed in this specification.

Figure 1:
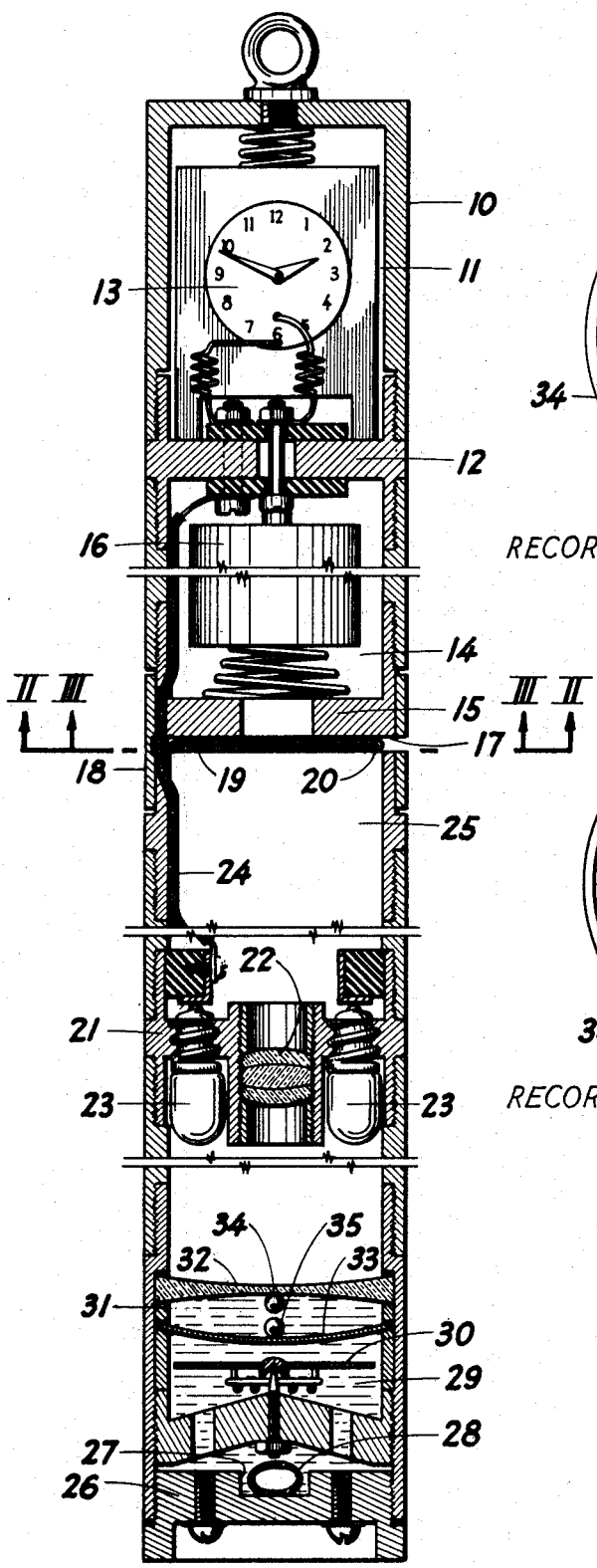
Figure 1 is a vertical sectional view through an inclination recorder to which this invention has been applied.

Referring to the drawing, and particularly to Figure 1, the reference number 10 indicates generally a closed cylindrical casing for the recording equipment, and, as the device of this example will include a magnetic compass, the whole structure, as well as the outer casing just mentioned, should be of non-magnetic material. Where a gyrocompass is used, or merely degree of inclination is to be measured, any suitable material could be employed. Casing 10 is divided by partitions and coupled together by threaded joints to form a number of chambers for the various parts of the mechanism to be described below.

The upper chamber 11 is formed by partition 12 and, in this example, contains a conventional clockwork actuated electric contactor generally designated 13, for a purpose which will be described below. The second chamber 14 is formed by partition 15 and is adapted to contain one or more dry batteries or other electric current source 16. Immediately below partition 15 in casing 10 is a suitable transverse slot 17 adapted to be closed by rotatable ring 18 and to hold a circular photographic film or disc of sensitized photographic paper 19 mounted in ring 20.

At a suitable distance below partition 15 and film 19 is a partition 21 in which is mounted a camera lens 22 surrounded by and shaded from a plurality of small electric lamps 23, which latter are connected by a suitable insulated conductor 24 to be in circuit with battery 16 and contactor 13. Chamber 25 is thus between partitions 15 and 21, and may be designated a film chamber.

The bottom of casing 10 is closed by a removable plug 26 in which is a recess 27 for a small airfilled rubber sack 28 to provide for expansion and contraction of the alcohol or other liquid 29 in which the card type magnetic compass mechanism generally designated 30, together with the transparent level indicating means generally designated 31, are submerged. In the example shown, compass 30 comprises a suitable bearing 36 mounted on pivot 37 and rotatably supporting a conventional circular compass card 38 and magnetized rods 39. Thus, when the clockwork actuated electric contactor 13 closes the circuit 24, connecting the battery 16 and lamps 23, the latter illuminate the level indicating means 31 and the card 38 of the compass or direction indicating means 30. Camera lens 22 will then project an image of the position of the two last named means on the photographically sensitive film or paper disc 19, making a record thereon which may be developed chemically in the usual manner. Obviously, if means were provided for taking successive exposures on a strip of film, as in Patent No. 1,960,038, the subject device would be equally applicable, the difference in the film feeding and electric contacting means having no particular effect on the level or direction indicating means.

Level indicating means 31, in this example, consists of a pair of accurately formed transparent members 32 and 33 such as watch crystals, arranged to be mutually concave toward each other and preferably with different radii of curvature. In this case the upper crystal 32 has twice the radius of curvature of the lower crystal. A buoyant, substantially spherical element 34 such as a hollow aluminum ball or even a bubble of air or gas is held against the concave lower surface of the upper crystal 32 by the liquid 29a, which is that part of the immersion liquid contained between crystals 32 and 33. A heavy element 35, which may be a ball of phosphor bronze, which will sink in liquid 29a, is retained upon the concave upper surface of crystal 33.

Thus, as the device is inclined from the vertical, the two elements 34 and 35 will move in diametrically opposite directions from their normal position in the center of the transparent members 32 and 33. Inasmuch as the lower surface of upper crystal 32 has twice the radius of curvature of the lower crystal face, buoyant element 34 will move twice as far from the center for a given inclination as will element 35. Thus the effective angle as well as the direction of the inclination is more readily determined, because of the two indicating elements involved, and the longer base line due to their movement in opposite directions. Preferably the upper crystal 32 is etched or engraved in concentric circles, as shown in Figures 2 and 3 to indicate the degree of angularity from the vertical.

Figure 2:
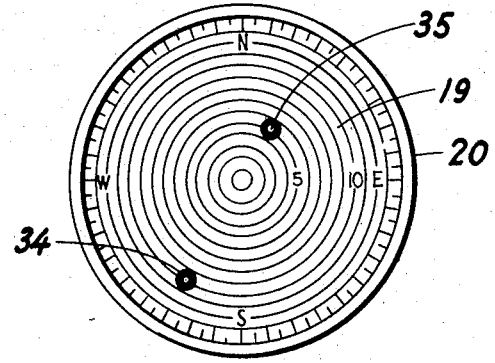
Figure 2 is a horizontal sectional view on line II—II of Figure 1, showing a typical record of a small degree of inclination taken on this device.
Figure 3:
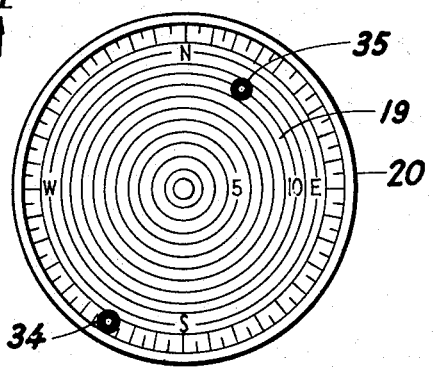
Figure 3 is a horizontal sectional view on line III—III of Figure 1, showing a second record where the inclination is at a greater angle than that which produced Figure 2.

For example, if the upper crystal 32 were proportioned so that the buoyant element 34 would reach the rim of the crystal 32 at 7 degrees inclination, and the lower crystal 33 were proportioned so that heavy element 35 would reach the rim of crystal 33 at an inclination of 14 degrees, the position of element 34 would give a very accurate indication of angles up to 7 degrees, for example, as shown in Figure 2, and, for greater inclinations, the lower or heavy element 35 would be effective to give the photographic record, as for 10 degrees of inclination, while element 34 would be at the rim of crystal 33, as shown in Figure 3.

If desired, to avoid annoying reflection from the upper surface of the transparent member 32, that surface may be made concave as shown, to insure that the reflection of the filaments of lamps 23 will not be directed into the camera lens 22.

It will be appreciated that the level indicating means 31 just described would also be applicable to those forms of instruments that do not operate by photographic records, but include a gel, cement, or the like that will set or congeal after a certain period of time, or after suitable controllable treatment, to hold the light and heavy elements 34 and 35 in the position determined by the degree of inclination of the device at the time the setting process was begun. Under such circumstances the mutually concave members 32 and 33 obviously need not be transparent but could be of any suitable material, and could be separable so that the position of the elements 34 and 35 could be observed after the device was removed from the well bore.

In consequence, although a specific embodiment of this invention has been described and illustrated, it is to be understood that modifications and changes could be made in it and in its environment without departing from that invention and all such that fall within the scope of the appended claims are embraced thereby.

I claim:

1. An inclination direction indicator comprising means forming a surface concave upwardly, a generally spherical element adapted to rest on said surface, means forming a surface concave downwardly, a fluid in contact with said last named surface, a generally spherical element adapted to be supported in said fluid to contact said last named surface, one of said concave surfaces having a longer radius of curvature than the other so that the element in contact therewith will be displaced a longer distance for a given degree of inclination than will the element which is in contact with the other concave surface, and means for indicating the direction of motion of said spherical elements from the center of said concave surfaces, so constructed and arranged that the direction of inclination of said indicator may be determined from the position of said elements with regard to said last named means.

2. An inclination indicator comprising means forming a surface concave upwardly, a generally spherical element adapted to rest on said surface, means forming a surface concave downwardly, a fluid in contact with said last named surface, and a generally spherical element adapted to be supported in said fluid to contact said last named surface, one of said concave surfaces having a longer radius of curvature than the other so that the element in contact therewith will be displaced a longer distance for a given degree of inclination than will the element which is in contact with the other concave surface.

3. An inclination indicator according to claim 2 in which one of said means is transparent over its entire effective surface so that when said means are superimposed both of said elements will be visible through said transparent means at any degree of inclination of said indicator.

4. An inclination indicator according to claim 2 in which both of said means are transparent over their entire effective surfaces so that when said means are superimposed light may be transmitted entirely through said indicator.

5. An inclination indicator according to claim 2 with a scale of inclination associated with one of said surfaces, said elements being adapted to cooperate to indicate on said scale the degree of inclination of said indicator.

HUGH B. WEBSTER.